United States Patent [19]

Badhwar

[11] 3,881,893
[45] May 6, 1975

[54] CHLORINE RECOVERY WITH AQUEOUS HYDROCHLORIC ACID

[75] Inventor: Ravinder K. Badhwar, Sarnia, Ontario, Canada

[73] Assignee: The Dow Chemical Company, Midland, Mich.

[22] Filed: Dec. 4, 1972

[21] Appl. No.: 311,458

[52] U.S. Cl. ............... 55/71; 423/220; 423/503
[51] Int. Cl. .............................................. B01d 53/02
[58] Field of Search ........ 55/71; 423/241, 503, 240; 204/98, 128

[56] References Cited
UNITED STATES PATENTS

| | | |
|---|---|---|
| 2,750,002 | 6/1956 | Hooker et al. ............................ 55/71 |
| 2,909,240 | 10/1959 | Colton .................................... 55/71 |
| 3,242,648 | 3/1966 | Young et al. ............................ 55/71 |
| 3,254,474 | 6/1966 | Van Dijk ............................... 423/503 |
| 3,568,409 | 3/1971 | Ferguson et al. ....................... 55/71 |

Primary Examiner—Oscar R. Vertiz
Assistant Examiner—Brian E. Hearn
Attorney, Agent, or Firm—Edward E. Schilling; Stephen R. Wright

[57] ABSTRACT

Impure chlorine vapor, typically from the liquefaction step of a chlorine plant, is purified by contacting the vapor with aqueous hydrochloric acid which takes up the chlorine vapor but not the usual gaseous impurities. The absorbed chlorine is separated from the acid and recovered by heating and/or by pressure reduction and the acid can be reused, preferably by recycling to contact other portions of the impure chlorine vapor.

15 Claims, 2 Drawing Figures

CHLORINE RECOVERY WITH AQUEOUS HYDROCHLORIC ACID

BACKGROUND OF THE INVENTION

The invention relates broadly to recovery of chlorine from gaseous mixtures. The invention relates specifically to the use of aqueous hydrochloric acid as an absorbing agent for the chlorine.

In the commercial manufacture of chlorine, the chlorine vapor output of an electrolytic cell is found to contain some impurities such as air, carbon dioxide, water vapor, chlorinated hydrocarbons, and trace inerts. The water vapor is largely removed before liquefaction by means of a drying step, e.g. passage through a sulfuric acid drying column. The heavier chlorinated hydrocarbons are largely condensed along with the chlorine during the liquefaction of the latter. The remaining uncondensed chlorine vapor contains gaseous impurities such as air, carbon dioxide, and trace chlorinated hydrocarbons. This gaseous mixture is usually not more than about 60 percent chlorine by weight and recovery of the chlorine on an economic basis is difficult, while discharge of the gas mixture into the atmosphere is ecologically and economically unacceptable.

The residual chlorine vapor is ordinarily separated from admixture with air by absorbing the chlorine into a suitable absorbent. The prior art uses either an organic liquid or water as the chlorine absorbent. However, the use of organic liquids is not very attractive because recovery of chlorine therefrom causes the loss of a portion of the liquid. Air pollution and expense in adding make-up liquid are the result. Water is not efficient as an absorbent because the solubility of chlorine therein is low. Moreover, water freezes in the lower portion of the range of working temperatures.

SUMMARY OF THE INVENTION

The present invention is based upon the discovery that upon bringing a gaseous mixture containing less than about 60 weight percent chlorine vapor into contact with aqueous hydrochloric acid, a major portion of the chlorine in the gaseous mixture is absorbed by the acid. The remainder of the gaseous mixture normally consists of components of atmospheric air and relatively little residual chlorine and may be vented off, but more usually is first scrubbed with an aqueous reactant for the residual chlorine. The aqueous acid containing absorbed chlorine is exposed to a reduced pressure or is heated, or both, which causes release of the absorbed chlorine. The chlorine vapor is removed from the acid and the acid is recovered for further fluid contacting as by recycling, or is otherwise reused.

BRIEF DESCRIPTION OF THE DRAWINGS

The drawing of FIG. 1 illustrates in schematic form a preferred embodiment of a system using the method of the present invention.

DETAILED DESCRIPTION OF THE INVENTION

Figure 1:
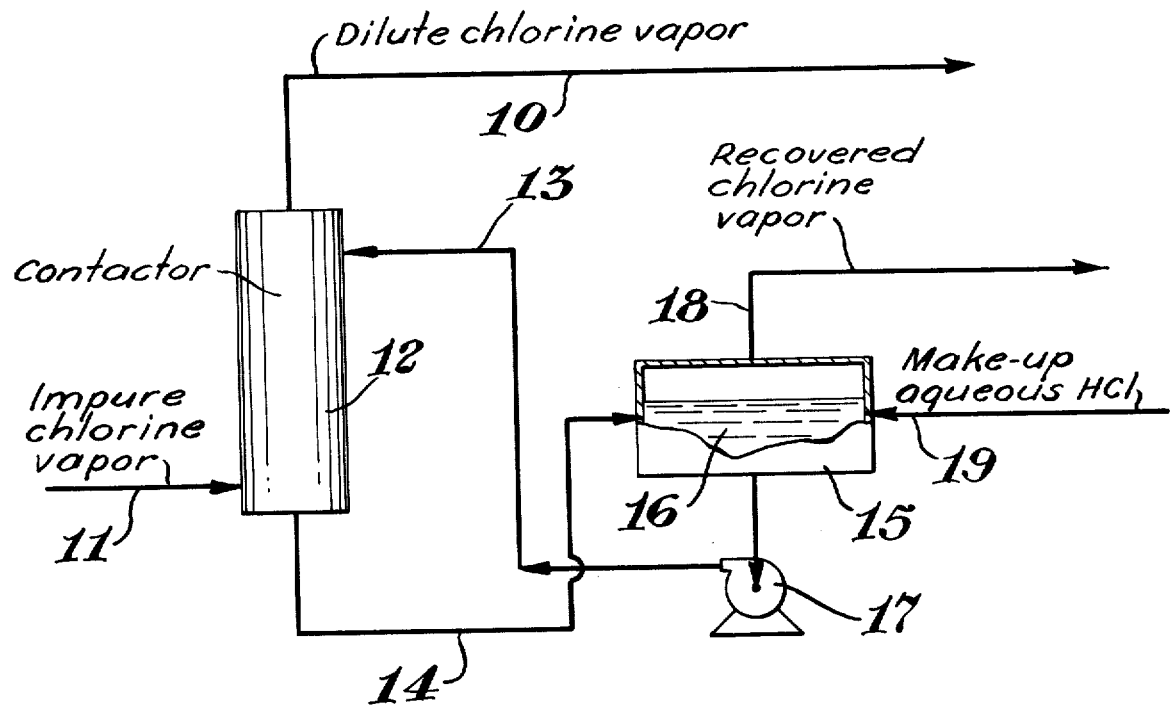

The operation of a chlorine recovery system typical of the method of the present invention may be better understood by reference to FIG. 1 together with the following description.

A gaseous mixture consisting of impure chlorine vapor is introduced through the supply pipe 11 to a contactor 12 wherein the vapor is brought into contact with aqueous hydrochloric acid supplied under superatmospheric pressure by a supply pipe 13. A major portion of the chlorine content of the gaseous mixture entering through the supply pipe 11 is absorbed by the aqueous acid, generating heat. This heat causes the temperature of the acid to rise. The warmed acid is conducted by a pipe 14 leading from the contactor 12 to the flash pot 15. The acid under pressure in pipe 14 is exposed subsequently to a pressure drop in the flash pot 15 which is maintained at a lower pressure than the acid in pipe 14, such as atmospheric, or lower, pressure. This results in rapid release of a major portion of the chlorine absorbed in the aqueous acid. The released chlorine vapor is extracted through a pipe 18 and directed back to the drying and liquefaction step (not shown) or other suitable use.

The liberation of chlorine vapor in the flash pot 15 cools the acid solution 16 which is drawn into a pump 17 and returned to the contactor 12 at a superatmospheric pressure via the supply pipe 13. The residual gas mixture remaining after substantially all the chlorine has been removed therefrom is vented through an effluent pipe 10 to a user of dilute chlorine vapor, such as an iron chloride production unit. Make-up aqueous hydrochloric acid is added through inlet pipe 19 to the contactor 12 as required to replace that lost in the process.

The term gaseous mixture as used herein refers to impure chlorine vapor consisting of a mixture of chlorine and one or more gases with each of which aqueous hydrochloric acid is not completely miscible and is not reactive although trace amounts of reactive gases may be tolerated. This gaseous mixture is supplied to the contactor at most any pressure reasonably contemplated in chlorine manufacturing processes. Usually the pressure employed is that at which the impure chlorine vapor is available. For example, a chlorine vapor stream from a liquefaction plant may be at a pressure of about 50–65 pounds per square inch gauge (psig). Higher pressures enhance the extent to which chlorine vapor is absorbed in the contactor and are appropriate where the chlorine content of the fluid is low, e.g., less than about 30 percent by weight. The chlorine is recoverable, according to the present invention, from a gas mixture containing most any percentage of chlorine below about 60 weight percent although a content of between about 10 and about 60 weight percent chlorine is most likely to be encountered as a practical matter. A gaseous mixture containing more than about 60 weight percent chlorine vapor may be treated according to the invention but will usually be most economically treated in another way as by liquefaction of the chlorine vapor. The temperature of the stream of impure chlorine vapor may be most any temperature likely to be encountered in the operation of a liquefaction unit, although chlorine is recovered more efficiently at lower temperatures since the solubility of chlorine vapor in aqueous hydrochloric acid varies inversely with the temperature of the acid.

The contactor is a device, for example, a bubble cap tower or a packed column, in which two fluids can be intimately admixed and then separated. Close contact between the aqueous hydrochloric acid and the impure chlorine vapor enhances more complete chlorine absorption.

The efficiency of chlorine vapor absorption by aqueous hydrochloric acid varies depending upon the chlorine concentration, the contactor efficiency, the number of contactors used in series, the gas to liquid ratio in the contactor and the temperature and pressure conditions inside the contactor, all as generally understood in the art.

However, about 75 to about 90 weight percent of the chlorine vapor content of the gaseous mixture is absorbed by the acid passing through the contactor in most cases. The unabsorbed portion consists of the unremoved chlorine and inerts such as oxygen, nitrogen, and traces of argon and helium. This remainder in admixture with some water vapor and hydrogen chloride absorbed in the tower or column is conducted to an absorber or other means for utilizing a stream of low chlorine content. For example, alkaline brines, caustic scrubbers, or devices which produce $FeCl_3$ or $CaCl_2$ may be provided to take up the residual chlorine in a safe and sometimes productive manner.

The aqueous hydrochloric acid may be supplied to the contactor, i.e. a tower or a column, at any temperature between its freezing point and about 220°F. However, the lower the acid temperature, the lower will be the contacting temperature and the greater the percentage of chlorine absorbed. A temperature of between about 40°F. and 80°F. is preferred; it is easily attainable and chlorine is much more soluble in aqueous hydrochloric acid than in water at such temperatures. The concentration of the hydrogen chloride in the aqueous hydrochloric acid should be between about 10 and about 40 weight percent, ideally about 25 percent by weight. The acid is supplied to the contactor at a superatmospheric pressure, for example, from about 40 to about 80 psig, (about 3 to about 6 atmospheres). The higher pressure facilitates absorption of chlorine vapor in the contactor and maintenance of a pressure drop in the flash pot to effect the escape or release of absorbed chlorine from the acid solution.

The flash pot is an enclosed zone within which chlorine is liberated by pressure reduction or by heating or by a combination thereof. Maintaining the flash pot at a pressure lower than that of the chlorine enriched acid outlet of the contactor allows substantially all of the chlorine which was absorbed in the contactor to be recovered. Since other gases than chlorine tend to have a low solubility in the aqueous acid they are absorbed only to a small extent by the acid in passing through the contactor. The acid stream leading to the flash pot is therefore essentially free of dissolved gases other than chlorine. Thus the chlorine vapor stream removed through the effluent pipe 18 leading from the flash pot usually contains from about 90 to about 99 weight percent chloride; the balance of this stream consists of water vapor and hydrogen chloride. After this stream is dried, it may be conveyed back to a liquefaction stage.

Some aqueous hydrochloric acid is lost through pipes 18 and 10 as water vapor and hydrogen chloride; replacement acid is added through pipe 19.

Modifications to this basic system may be useful where the chlorine content of the gaseous mixture is low, e.g. below about 30 percent, or where the chlorine is supplied at a relatively low pressure, e.g. at about atmospheric.

One modification involves cooling the acid stream used in the chlorine vapor absorption process in the contactor. The resulting absorption is effected at a lower temperature wherein a greater percentage of chlorine is absorbed or the chlorine is absorbed at a higher rate. This cooling may be accomplished with heat exchangers, external refrigeration devices, or a combination thereof applied to recycled aqueous acid.

Another modification involves compressing the impure chlorine vapor stream and then cooling the so-compressed gases to provide a gas stream of higher pressure to the contactor. Superatmospheric pressures in the range from about 2 to about 5 atmospheres facilitate the efficient absorption of chlorine.

One may also provide multiple absorption towers or contactors as well as multiple flash pots in respective series to improve chlorine vapor recovery.

A particularly useful modification is an integrated scheme for the combination of the present invention with a process for the purification of product stream chlorine utilizing aqueous hydrochloric acid to remove impurities such as salt sprays, water, and nitrogen trichloride. This latter process is the subject of U.S. Pat. No. 3,568,409, and the teachings therein are hereby incorporated by reference into the instant specification.

In this scheme the chlorine absorbed according to the practice of the present invention is released in the zone in which the product stream is treated for removal of impurities. Maintenance of a reduced pressure within an existing chlorine product stream scrubber allows chlorine to be released therewithin, obviating the need for a flash pot.

Figure 2:
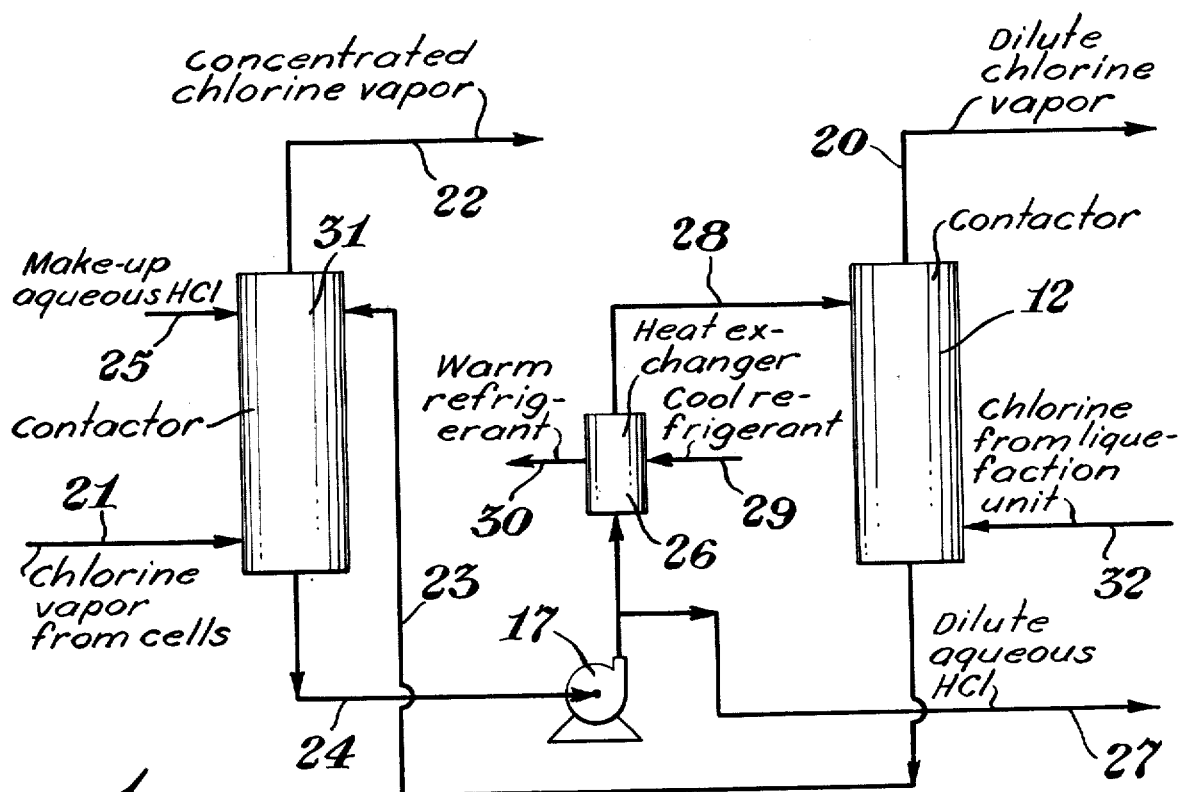
FIG. 2 is a fragmentary schematic view of a modification of the preferred embodiment shown in FIG. 1.

Reference to FIG. 2 aids in the understanding of the method of this embodiment. Therein a vapor mixture rich in chlorine from electrolytic cells is conducted by an inlet pipe 21 into a contactor 31 for purification. Impurities contained in the gaseous mixture such as water, salt spray, and nitrogen trichloride are largely absorbed by the aqueous hydrochloric acid supplied by supply pipe 23 at a superatmospheric pressure. Acid is returned from the contactor 31 at a reduced pressure relative to that in the supply pipe 23, e.g., atmospheric. The pressure in contactor 31 is lower than in contactor 12 or pipe 23. Exposure of the acid from pipe 23 to this pressure drop causes the release of a large portion of the chlorine content of said acid which was obtained in the contactor 12 according to the practice of the present invention.

The purified chlorine vapor from the electrolytic cells and the chlorine vapor released by the acid delivered by supply pipe 23 are removed by pipe 22 for further treatment, e.g., by drying with $H_2SO_4$.

The aqueous hydrochloric acid is removed from the contactor 31 through the return pipe 24 by the pump 17. Thereafter a small portion of the acid is removed from the system by dilute acid recovery pipe 27. The larger portion of the acid is cooled by its passage through a heat exchanger 26 and then is delivered to the contactor 12 by a pipe 28. The heat exchanger 26 is supplied with cool refrigerant by inlet pipe 29; warmed refrigerant is removed through outlet pipe 30.

What is claimed is:

1. A method for recovering at least a portion of the chlorine content of a gaseous mixture containing less than about 60 percent chlorine by weight comprising contacting said mixture with an aqueous hydrochloric acid solution of concentration between about 10 and 40 weight percent and at a temperature ranging from the freezing point of the solution to about 220°F., which solution is supplied at a superatmospheric pressure, said gaseous mixture being supplied at a pressure not less than that of said solution, whereby a major portion of the chlorine content is adsorbed leaving unabsorbed gases and separating the solution containing absorbed chlorine from said unabsorbed gases.

2. The method of claim 1 wherein the absorbed chlorine is discharged from the aqueous hydrochloric acid by exposing the acid to at least one of (1) a pressure reduction and (2) heating sufficient to cause release of the chlorine as vapor.

3. The method of claim 1 comprising the sequence of steps:
   a. sufficiently contacting the gaseous mixture with an aqueous hydrochloric acid solution to effect absorption of a major portion of the chlorine content of said gaseous mixture,
   b. venting the remainder of the gaseous mixture,
   c. exposing the acid to at least one of (1) a pressure reduction and (2) heating sufficient to release the absorbed chlorine as vapor from said acid solution,
   d. removing the chlorine vapor from the vicinity of the aqueous acid, and
   e. reusing the aqueous hydrochloric acid for the recovery of chlorine.

4. The method of claim 3 wherein the source of the gaseous mixture is the gaseous discharge from a chlorine liquefaction unit.

5. The method of claim 3 wherein the gaseous mixture contains from about 10 to about 60 weight percent chlorine.

6. The method of claim 3 wherein from about 75 to about 90 weight percent of the chlorine content of the gaseous mixture is recovered.

7. The method of claim 3 wherein the concentration of hydrogen chloride in the aqueous hydrochloric acid is about 25 weight percent.

8. The method of claim 3 wherein the temperature of the aqueous hydrochloric acid when brought into contact with the gaseous mixture is from about 40° to about 80°F.

9. The method of claim 3 wherein the gaseous mixture to be contacted with aqueous hydrochloric acid is supplied at a superatmospheric pressure.

10. The method of claim 3 carried out in conjunction with scrubbing with aqueous hydrochloric acid the chlorine vapor product stream supplied from an electrolytic cell for making chlorine, wherein the aqueous hydrochloric acid utilized for scrubbing is aqueous hydrochloric acid which has absorbed a substantial portion of the chlorine content of said gaseous mixture containing less than about 60 percent by weight chlorine the said acid during said scrubbing being subjected to a pressure drop resulting in the release of absorbed chlorine as a vapor into the said product stream, whereby chlorine is added to the product stream and acid miscible impurities are removed from the product stream during the same step.

11. The method of claim 1 wherein the absorbed chlorine is discharged from the aqueous hydrochloric acid by exposing the acid to a heating sufficient to cause release of the chlorine as vapor.

12. The method of claim 3 wherein the absorbed chlorine is released by exposing acid to a pressure drop sufficient to effect said release.

13. The method of claim 3 wherein the absorbed chlorine is released by exposing said acid to heating sufficient to effect said release.

14. The method of claim 3 wherein the absorbed chlorine is released by exposing said acid to both a pressure drop and a heating sufficient in combination to effect said release.

15. A method of concurrently recovering at least a portion of the chlorine content of a gaseous mixture containing less than about 60 weight percent chlorine vapor and scrubbing with an aqueous hydrochloric acid solution a product stream containing greater than about 60 weight percent chlorine vapor supplied from an electrolytic cell at a predetermined superatmospheric pressure which comprises:
   a. feeding said aqueous hydrochloric acid solution into a contacting device concurrently with said product stream, which aqueous hydrochloric acid solution (1) has previously absorbed a substantial portion of the chlorine content of said gaseous mixture by having contacted it while said gaseous mixture was at a pressure not less than that of said acid solution, and (2) is under a pressure higher than said predetermined pressure,
   b. scrubbing, in said contacting device at substantially said predetermined pressure, impurities from said product stream, which impurities enter into said aqueous hydrochloric acid solution,
   c. releasing at least a portion of the chlorine content of said aqueous hydrochloric acid solution as a vapor by exposure of said aqueous hydrochloric acid solution to pressure reduction within said contacting device, which reduction is due to the difference between said predetermined pressure of the chlorine vapor in the contacting device and the higher pressure of said aqueous hydrochloric acid solution admitted thereto,
   d. separating said scrubbed product stream vapor from said aqueous hydrochloric acid solution containing said impurities, and
   e. reusing said aqueous hydrochloric separated acid solution to recover chlorine from said gaseous mixture.

* * * * *